Patented Nov. 17, 1936

2,061,122

UNITED STATES PATENT OFFICE 2,061,122

COOKING FAT AND PROCESS OF MAKING SAME

Herbert S. Coith and Verling M. Votaw, Wyoming, Ohio, assignors to The Procter & Gamble Company, Cincinnati, Ohio, a corporation of Ohio No Drawing. Application October 3, 1932, Serial No. 636,016

24 Claims. (Cl. 99—123)

Our invention relates to edible fats and fatty oils and the process of making same, and relates specifically to the improvement of cooking fats by adding thereto free fatty acid of edible grade.

Heretofore a low percentage of free fatty acid has been regarded as one of the principal criteria of good quality of edible fats, which term we use herein in its broad sense to include solid and semi-solid fats and also fatty oils. It so happens that the established methods of producing, transporting, storing and processing edible fats have been such that the production of a commercial edible fat of good color, flavor, odor, and stability has necessarily produced also fat of low free fatty acid content.

For instance, vegetable oils are commonly refined with alkali, and animal fats are frequently also so refined, with resulting decrease in free fatty acid to a small fraction of 1%. Steam deodorization under vacuum, with or without alkali refining as a preceding step, is another common process which tends markedly to decrease the free fatty acid content of edible fats. Both these steps are commonly regarded as being essential for the production of edible vegetable fat of the best quality.

Even in the case of edible fats which do not require either alkali refining or steam deodorizing, careful manufacturing results in low free fatty acid content. Thus high grade butter fat, lard, and olive oil do not require alkali refining or steam deodorization. Nevertheless, determination of free fatty acid is the outstanding chemical test in general use for checking the quality of such fats, and a low percentage of free fatty acid is regularly accepted as evidence of high quality.

According to the present invention, we start with a fat known to be of good edible grade, and incorporate therewith a relatively small proportion of free fatty acid of edible grade. We have found that this step increases the value of the fat as a cooking fat, without any substantial sacrifice of quality with respect to color, odor, flavor, or stability. This is a surprising discovery, because removal of free fatty acid by the customary refining of fats has been generally accepted as beneficial, and some authorites have even considered it the major purpose of refining.

In general, we find that the cooking fats now commercially available contain considerably less free fatty acid than could be advantageously present. We find that the quality of baked goods made with these cooking fats can on the average be greatly improved by incorporating an additional amount of free fatty acid. This improvement manifests itself particularly in the light, tender texture and greater volume of baked products, especially cakes.

Our invention is applicable particularly but not exclusively to the production of shortening for use in baked products containing sugar, and usually also a chemical leavening agent, as well as flour and shortening. Cakes made with the shortening as disclosed in the present invention have unusually light texture, their increased volume as compared with cakes made in the usual way being of considerable commercial advantage in bakery practice. Production of cakes of light texture and correspondingly large volume has heretofore been particularly difficult in the case of cakes of relatively high sugar content, for example those containing a quantity of sugar more than 100% of the weight of the flour present. With use of the shortening of the present invention, cakes containing even 50 or 75 percent more sugar than flour are readily produced without sacrifice of the light, tender texture generally desired in the finished product. Such cakes are very pleasing on account of their unusually soft, smooth, and moist eating quality, as well as on account of their sweetness and volume.

The free fatty acid suitable for use in accordance with the present invention should be derived predominantly from fatty acids having 16 or more carbon atoms in their molecular formula. Both saturated and unsaturated fatty acids are of value, but we prefer predominantly unsaturated fatty acids for best results. Fatty acids of coconut oil and similar oils have an undesirable flavor and should not be used in substantial amount. As is well known, butter fatty acids also have an undesirable flavor. The ordinary fatty acids of 16 or higher carbon content in their molecular formula are practically odorless, and do not have a pronounced flavor. Suitable fatty acids may be made by alkali saponification of common fats already processed so as to be of edible grade, such as lard, peanut oil or hydrogenated cottonseed oil, and by treatment of the resulting soap with mineral acid. These reactions may be carried out according to well-known methods. During processing, and thereafter, it is desirable that contact of the free fatty acid with air be avoided or kept to the practical minimum, for instance, by the use of tight containers and by use of an inert gas, such as nitrogen.

The quantity of fatty acid incorporated with cooking fat according to our invention may be varied within wide limits. In the case of a shortening made from alkali refined fat, such as partially hydrogenated cottonseed oil, the effectiveness of even a few tenths of one percent of free fatty acid added to this plastic shortening can be detected in the improved appearance and eating quality of sweet baked goods. In the case of an unrefined edible fat already containing, for example, about one per cent free fatty acid, the improvement due to addition of a few tenths of one per cent additional free fatty acid may not be easily observed, but doubling the amount of free fatty acid produces a marked difference in the action of the fat in bakery practice.

The amount of free fatty acid actually to be added to any given cooking fat will depend upon the nature of the fat and particularly upon its intended use. For instance, in the case of cooking fat to be used both in baked goods and for frying, we prefer to use alkali refined and deodorized fat and bring the final free fatty acid to a percentage between .25 and 2.0; but in the case of a shortening intended for use only in baked products, we prefer to start with an already prepared edible fat which, whether alkali refined or not, is of high grade and contains less than one (1) per cent free fatty acid, and to adjust the final free fatty acid to a percentage between 2 and 10.

For the manufacture of our product, we prefer the method of producing separately almost neutral fat and free fatty acid, both of edible grade, and thereafter mixing same either in the molten or partially solidified condition. However, other methods of accomplishing the same result may be used. For instance, an ordinary edible fat may be partially saponified with caustic alkali, preferably sodium hydroxide in concentrated solution, and the reaction product then acidulated with a strong acid, preferably sulfuric or phosphoric, thereby liberating the required fatty acid in the cooking fat and forming an alkali salt which, together with any excess of acid used, can be washed out of the fat by means of water. Likewise the free fatty acid required in our product can be formed from the neutral fat by direct reaction with water. For instance, the edible fat may be subjected to a limited hydrolysis by the use of enzymes and the reaction product filtered after removal of the excess water. Likewise partial hydrolysis may be effected according to the well-known autoclave method, and the small quantity of soap catalyst used in this reaction removed by acid washing the reaction product. We do not consider the Twitchell process, as commonly practiced, suitable for the production of a partially hydrolyzed fat of edible grade, but our product may be prepared by a modification of the Twitchell process in which the sulfonic acid catalyst is water soluble, as described in U. S. Patent No. 1,622,974.

Examples of shortening made in accordance with the present invention are as follows:

*Example 1*

| | Per cent |
|---|---|
| Hydrogenated cottonseed oil of 66 iodine value | 98.0 |
| Free fatty acids derived from hydrogenated cottonseed oil of 66 iodine value | 2.0 |

*Example 2*

| | Per cent |
|---|---|
| Lard | 96.0 |
| Free fatty acids derived from lard | 4.0 |

*Example 3*

| | Per cent |
|---|---|
| Butter | 94.0 |
| Free fatty acids derived from hydrogenated cottonseed oil of 66 iodine value | 6.0 |

As an example of baked goods in which the use of our improved shortenings is advantageous as compared with the shortenings heretofore available, we cite the following cake recipe:

| | Pound | Ounces |
|---|---|---|
| Sugar | 1 | 1 5/8 |
| Salt | 0 | 5/8 |
| Cake flour | 1 | 0 |
| Baking powder | 0 | 5/8 |
| Fat such as that described in Example 1 | 0 | 6 1/8 |
| Milk | 0 | 11 7/8 |
| Egg whites | 0 | 7 7/8 |

All of the ingredients with the exception of the egg whites are placed in the bowl of a mixing machine, for example a Hobart mixer, and mixed at slow speed for 7 minutes. The egg whites are then added and the mixing continued for 7 minutes at slow speed. A temperature of 375° F. is used in baking the cakes.

Baked goods, such as the above, are not claimed herein, but are further described and claimed in our copending application, Serial Number 636,014, filed concurrently herewith.

We claim:

1. A substantially dry shortening agent of lard-like to solid consistency comprising edible fat and added free fatty acid of molecular formula containing predominantly at least 16 carbon atoms, the amount of added free fatty acid being sufficient to effect substantial increase in volume of cakes baked with the shortening agent and containing more sugar than flour as compared with similar cakes baked with a shortening agent otherwise similar but without the increased free fatty acid content.

2. A substantially dry cooking fat consisting of alkali-refined edible fat and added free fatty acid of molecular formula containing predominantly at least 16 carbon atoms, the amount of this fatty acid being sufficient to effect substantial increase in volume of cakes baked with the cooking fat and containing more sugar than flour as compared with similar cakes baked with a fat otherwise the same but without the increased free fatty acid content.

3. Substantially dry cooking fat consisting of substantially neutral deodorized fat and added free fatty acid of molecular formula containing predominantly at least 16 carbon atoms, the amount of this fatty acid being sufficient to effect substantial increase in volume of cakes baked with the cooking fat and containing more sugar than flour as compared with similar cakes baked with a fat otherwise the same but without the increased free fatty acid content.

4. Substantially dry cooking fat of lard-like consisting comprising lard and added free fatty acid of molecular formula containing predominantly at least 16 carbon atoms, the amount of added free fatty acid being sufficient to effect substantial increase in volume of cakes baked with the fat and containing more sugar than flour as compared with similar cakes baked with a fat otherwise the same but without the increased free fatty acid content.

5. A substantially dry plastic shortening comprising partially hydrogenated fat and added free fatty acid of molecular formula containing predominantly at least 16 carbon atoms, the amount of added free fatty acid being sufficient to effect substantial increase in volume of cakes baked with the shortening and containing more sugar than flour as compared with similar cakes baked with a shortening otherwise the same but without the increased free fatty acid content.

6. Substantially dry cooking fat comprising substantially neutral fat and free fatty acid derived from a partially hydrogenated, predominantly unsaturated triglyceride fat of edible grade, the amount of this fatty acid being sufficient to effect substantial increase in volume of cakes baked with the cooking fat and containing more sugar than flour as compared with similar cakes baked with a fat otherwise the same but without the increased free fatty acid content.

7. A substantially dry semi-solid cooking fat comprising partially hydrogenated cottonseed oil and not substantially less than 2% fatty acid liberated from partially hydrogenated cottonseed oil.

8. The process of improving lard and like semi-solid substantially dry cooking fats which comprises incorporating therein free fatty acid of molecular formula containing predominantly at least 16 carbon atoms, the amount of this fatty acid being sufficient to effect substantial increase in volume of cakes baked with the cooking fat and containing more sugar than flour as compared with similar cakes baked with a fat otherwise the same but without the increased free fatty acid content.

9. In the manufacture of substantially dry cooking fat, the step which comprises incorporating therein free fatty acid of molecular formula containing predominantly at least 16 carbon atoms, the amount of this fatty acid being sufficient to effect substantial increase in volume of cakes baked with the cooking fat and containing more sugar than flour as compared with similar cakes baked with a fat otherwise the same but without the increased free fatty acid content.

10. The process of manufacturing substantially dry cooking fat which consists in mixing deodorized edible fat with predominantly unsaturated free fatty acid of molecular formula containing chiefly 16 and more carbon atoms, the amount of this fatty acid being sufficient to effect substantial increase in volume of cakes baked with the cooking fat and containing more sugar than flour as compared with similar cakes baked with a fat otherwise the same but without the increased free fatty acid content.

11. The process of improving substantially dry cooking fat derived from fatty acids of molecular formula containing predominantly not fewer than 16 carbon atoms, which comprises forming therein free fatty acid by acidulation of soap resulting from partial saponification of said fat, the amount of this fatty acid being sufficient to effect substantial increase in volume of cakes baked with the cooking fat and containing more sugar than flour as compared with similar cakes baked with a fat otherwise the same but without the increased free fatty acid content.

12. The process of improving substantially dry cooking fat derived from fatty acids of molecular formula containing predominantly not fewer than 16 carbon atoms, which comprises forming therein free fatty acid by subjecting said fat to limited reaction with water in presence of a catalyst, the amount of this fatty acid being sufficient to effect substantial increase in volume of cakes baked with the cooking fat and containing more sugar than flour as compared with similar cakes baked with a fat otherwise the same but without the increased free fatty acid content.

13. A substantially dry shortening agent of lard-like to solid consistency consisting essentially of edible fat and added free fatty acid of molecular formula containing predominantly at least 16 carbon atoms, the amount of added free fatty acid being sufficient to effect substantial increase in volume of cakes baked with the shortening agent and containing more sugar than flour as compared with similar cakes baked with a shortening agent otherwise similar but without the increased free fatty acid content.

14. Substantially dry cooking fat consisting essentially of substantially neutral fat and free fatty acid derived from a partially hydrogenated, predominantly unsaturated triglyceride fat of edible grade, the amount of this fatty acid being sufficient to effect substantial increase in volume of cakes baked with the cooking fat and containing more sugar than flour as compared with similar cakes baked with a fat otherwise the same but without the increased free fatty acid content.

15. Semi-solid substantially dry cooking fat consisting essentially of partially hydrogenated cottonseed oil and fatty acid liberated from the triglycerides of partially hydrogenated cottonseed oil, the amount of this fatty acid being sufficient to effect substantial increase in volume of cakes baked with the cooking fat and containing more sugar than flour as compared with similar cakes baked with a fat otherwise the same but without the increased free fatty acid content.

16. A substantially dry shortening agent comprising an intimate mixture of edible fat and not substantially less than 2% of free higher fatty acid.

17. A substantially dry cooking fat consisting of alkali-refined edible fat and not substantially less than 2% added free higher fatty acid.

18. A substantially dry cooking fat consisting of substantially neutral deodorized fat and not substantially less than 2% added free higher fatty acid.

19. In the manufacture of substantially dry cooking fat, the step which comprises incorporating therein free higher fatty acid in amount not substantially less than 2% and not substantially greater than 10%.

20. A substantially dry shortening agent consisting essentially of an edible fat of relatively low free fatty acid content and intimately mixed therewith separately formed free fatty acid in amount to make the total free fatty acid content of the shortening not less than about 2%.

21. The process of improving substantially dry cooking fat of relatively low free fatty acid content which comprises partially saponifying edible triglyceride fat in which the fatty acid radicals are principally of molecular formula containing at least sixteen carbon atoms, acidulating the resulting product so as to liberate the fatty acid of the soap therein, and embodying the acidulated fatty material in the cooking fat in amount sufficient to yield a finished shortening containing between about 2% and about 10% total free fatty acid.

22. The process of manufacturing substantially dry shortening consisting essentially of triglyceride fat and a relatively small proportion of free fatty acid, which comprises partially saponifying edible triglyceride fat, acidulating the resulting product so as to liberate the fatty acid of the soap therein, and embodying the acidulated material in the shortening in amount sufficient to make the percentage of higher free fatty acid in the finished product not less than about 2% of the total fatty material.

23. A substantially dry shortening agent comprising fatty material, all of said fatty material consisting essentially of triglyceride fat and a smaller amount but not less than about 2% of higher free fatty acid, and including the product of the partial saponification of a triglyceride oil or fat and the acidulation thereof.

24. A substantially dry cooking fat of improved shortening value comprising a major proportion of triglycerides of higher fatty acids and containing the product of the partial saponification of a triglyceride oil or fat and the acidulation thereof, the amount of said product being sufficient to make the free fatty acid between about 2% and about 10% of the whole cooking fat.

HERBERT S. COITH.
VERLING M. VOTAW.